United States Patent
Jin et al.

(10) Patent No.: US 8,516,180 B2
(45) Date of Patent: Aug. 20, 2013

(54) PROCESSING SYSTEM AND ELECTRONIC DEVICE WITH SAME

(75) Inventors: Lei Jin, Shenzhen (CN); Kim-Yeung Sip, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 1069 days.

(21) Appl. No.: 12/490,279

(22) Filed: Jun. 23, 2009

(65) Prior Publication Data
US 2010/0169562 A1 Jul. 1, 2010

(30) Foreign Application Priority Data
Dec. 31, 2008 (CN) .......................... 2008 1 0306736

(51) Int. Cl.
*G06F 13/14* (2006.01)
(52) U.S. Cl.
USPC ........... 711/100; 711/105; 711/170; 702/117; 718/105

(58) Field of Classification Search
USPC .......... 711/100, 105, 170; 702/117; 718/105
See application file for complete search history.

(56) References Cited

U.S. PATENT DOCUMENTS

| | | | |
|---|---|---|---|
| 7,086,058 B2 * | 8/2006 | Luick | 718/102 |
| 2003/0214674 A1 * | 11/2003 | Hamamoto et al. | 358/1.16 |
| 2009/0113084 A1 * | 4/2009 | Dike | 710/36 |

* cited by examiner

*Primary Examiner* — Jae Yu
(74) *Attorney, Agent, or Firm* — Altis Law Group, Inc.

(57) ABSTRACT

A processing system for use in an electronic device is disclosed. The processing system includes a memory unit, an application processor connected to the memory unit, and a baseband processor connected to the memory unit and the application processor. The memory unit is configured for storing information of the electronic device. The application processor is configured for handling applications of the electronic device. The baseband processor is configured for providing communication capabilities for the electronic device. The application processor includes a temperature detector configured for detecting the temperature of the application processor. When the sensed temperature of the application processor is higher than a predetermined temperature, the baseband processor is instructed by the application processor to share workload of the application processor.

13 Claims, 1 Drawing Sheet

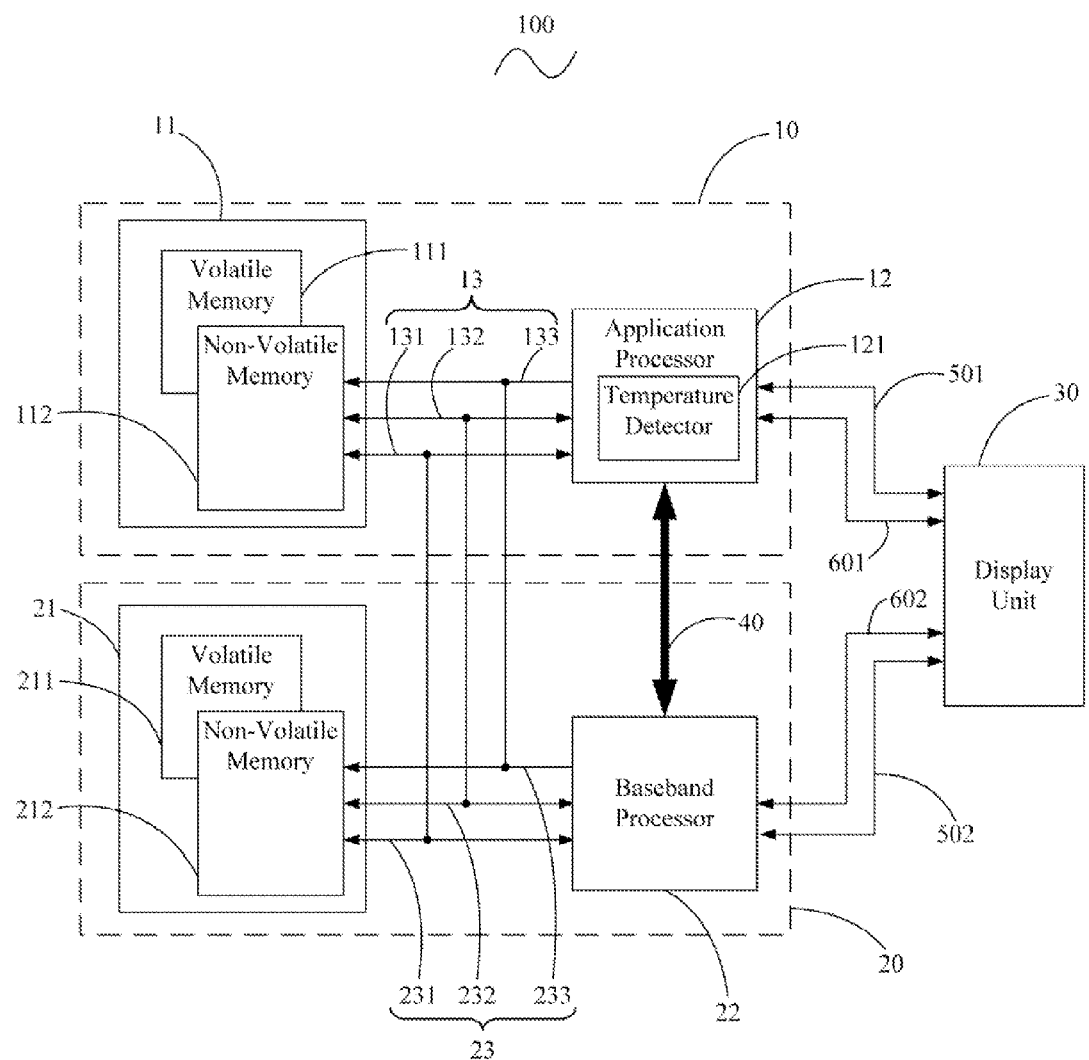

PROCESSING SYSTEM AND ELECTRONIC DEVICE WITH SAME

BACKGROUND

1. Technical Field

The present disclosure relates to processing systems and, particularly, relates to a processing system for electronic device.

2. Description of Related Art

Mobile phones have gradually evolved from voice service only into a multifunctional platform with video, data, entertainment, commerce, and payment functions. The baseband processor has failed to satisfy the need of the increasing multimedia applications. Thus, an application processor is included in mobile phones. The baseband processor may provide communication capabilities while the application processor may handle a range of other tasks such as providing user interfaces, multimedia application handling, and games application handling.

However, the display of a mobile phone is connected to the application processor but not the baseband processor. If the baseband processor and the display need to exchange image/video data, the baseband processor needs to send a transmitting request to the application processor firstly, then the application processor transmits image/video data to the display. The application processor needs not only to process tremendous workload of the image/video data, but also to exchange data with the display for the baseband processor. If the workload of the application processor oversteps the normal processing ability of the application processor, the temperature of the application processor will increase and the processing speed and the performance of the application processor will suffer.

What is needed, therefore, is a processing system to overcome the above mentioned problems.

BRIEF DESCRIPTION OF THE DRAWINGS

The FIGURE is a functional block diagram of an electronic device with a processing system according to an exemplary embodiment of the disclosure.

DETAILED DESCRIPTION

Referring to the FIGURE, a functional block diagram of an electronic device 100, according to an exemplary embodiment, is shown. The electronic device 100 includes an application processing system 10, a baseband processing system 20, and a display unit 30. The application processing system 10 and the baseband processing system 20 are both connected to the display unit 30.

The application processing system 10 includes a first memory unit 11 and an application processor 12 connected to the first memory unit 11.

The first memory unit 11 includes a first volatile memory 111 and a first non-volatile memory 112. The first volatile memory 111 is configured for temporarily storing runtime data and/or executed application(s). The first non-volatile memory 112 is configured for storing data/information (e.g. image/video information) and other resident software. In a typical electronic device, the first volatile memory 111 can be static random-access memory (SRAM, e.g. 6 transistor based memory) or pseudo-static random-access memory (pSRAM) or synchronous dynamic random-access memory (SDRAM) based memories and, the first non-volatile memory 112 can be not or flash (NOR Flash) or not and flash (NAND Flash) or mirror-bit Flash or read-only memory (ROM).

The application processor 12 is configured for handling various tasks, such as providing user interfaces, multimedia application handling, and games application handling, etc. The application processor 12 includes a temperature detector 121 for detecting the temperature of the application processor 12. In addition, a predetermined temperature(s) is stored in the first memory unit 11. In application, the temperature detector 121 can be a negative temperature coefficient (NTC) thermistor.

The application processor 12 and the first memory unit 11 are connected to each other via a first bus unit 13 for communicating with each other. The first bus unit 13 includes a data bus 131, a control bus 132, and an address bus 133. The data bus 131, e.g., a 16 bits bus, is configured for transferring data between the first memory unit 11 and the display unit 30. The control bus 132 is configured for transferring control commands (e.g. read, write, interrupt, acknowledge, etc.) to control and coordinate the application processing system 10. The address bus 133 is configured for locating memory address of the data/information.

The first memory unit 11 and the application processor 12 can be integrally manufactured as an application processor chip.

The baseband processing system 20 includes a second memory unit 21 and a baseband processor 22 connected to the second memory unit 21. The second memory unit 21 is substantially similar to the first memory unit 11. The baseband processor 22 is mainly configured for providing communication capabilities for the electronic device 100. Additionally, the baseband processor 22 can be also configured for handling tasks for the application processor 12 under predetermined conditions.

The baseband processor 22 and the second memory unit 21 are connected to each other by a second bus unit 23 for communicating with each other. The second bus unit 23 includes a data bus 231, a control bus 232, and an address bus 233. The data bus 231, the control bus 232 and the address bus 233 generally have the same functions as the data bus 131, the control bus 132 and the address bus 133.

The application processing system 10 and the baseband processing system 20 are connected to each other by a universal asynchronous receiver/transmitter (UART) 40, thus data/information and signals can be transmitted between the baseband processing system 20 and the application processing system 10 through the UART.

The display unit 30 is configured for displaying image(s)/video(s) information transmitted from the first memory unit 11. The display unit 30 is connected to the application processor 12 and the baseband processor 22 correspondingly through control buses 501, 502, and data buses 601, 602. The images/videos stored in the first memory unit 11 can be transmitted to display unit 30 through the data bus 601, 602. In this embodiment, the display unit 30 is a liquid crystal display (LCD).

The first memory unit 11 and the second memory unit 21 can be integrally manufactured as a memory card or any other memory devices.

In use, under certain conditions, the application processing system 10 and the baseband processing system 20 can cooperately handle applications (e.g. multimedia and/or game application, etc.). For example, when the application processor 12 is handling applications, the temperature is detected by the temperature detector 121. Then, the temperature of the application processor 12 is compared with the predetermined temperature stored in the first memory unit 11. If the temperature is no more than the predetermined temperature, the application processing system 10 continues to handle applications. If the sensed temperature is more than the predetermined temperature, the application processor 12 sends a control command to the baseband processor 22, the baseband processor 22 is activated to share the workload of the application processor 12 (e.g. the application processor handles game application and the baseband processor handles multimedia application respectively). Therefore, the processing speed and the performance of the electronic device 100 can be improved, and the service life of the application processor 12 can be correspondingly prolonged.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A processing system for use in an electronic device, comprising:
    a memory unit configured for storing information of the electronic device;
    an application processor connected to the memory unit for handling applications of the electronic device, the application processor comprising:
        a temperature detector configured for detecting the temperature of the application processor; and
    a baseband processor connected to the memory unit, connected to the application processor by a universal asynchronous receiver/transmitter, and configured for providing communication capabilities for the electronic device;
    wherein when the sensed temperature of the application processor is higher than a predetermined temperature, the application processor directly sends a control command to the baseband processor via the universal asynchronous receiver/transmitter to direct the baseband processor to share workload of the application processor.

2. The processing system as claimed in claim 1, wherein: the memory unit comprises a first memory unit connected to the application processor and a second memory unit connected to the baseband processor.

3. The processing system as claimed in claim 2, wherein: each of the first memory unit and the second memory unit comprises a volatile memory and a non-volatile memory; the volatile memory is configured for temporarily storing runtime data and/or executed application(s); and the non-volatile memory is configured for storing data/information and other resident software.

4. The processing system as claimed in claim 3, wherein: the first volatile memory is selected from the group consisting of static random-access memory (SRAM), pseudo-static random-access memory (pSRAM) and synchronous dynamic random-access memory (SDRAM) based memories and the first non-volatile memory is selected from the group consisting of not or flash (NOR Flash), not and flash (NAND Flash), mirror-bit Flash and read-only memory (ROM).

5. The processing system as claimed in claim 2, wherein: the processing system comprises a first bus unit and a second bus unit; the first bus unit connects the application processor and the first memory unit to each other; and the second bus unit connects the baseband processor and the second memory unit to each other.

6. The processing system as claimed in claim 5, wherein: each of the first bus unit and the second bus unit comprises a data bus, a control bus, and an address bus; the data bus is configured for data transferring; the control bus is configured for transferring control commands to control and coordinate the processing system; and the address bus is configured for locating memory address of the data/information.

7. An electronic device comprising:
    a processing system, comprising:
        a memory unit configured for storing data/information of the electronic device;
        an application processor connected to the memory unit for handling applications of the electronic device, the application processor comprising:
            a temperature detector configured for detecting the temperature of the application processor; and
        a baseband processor connected to the memory unit, connected to the application processor by a universal asynchronous receiver/transmitter, and configured for providing communication capabilities for the electronic device communicating with other devices; and
    a display unit connected to the application processor and the baseband processor of the processing system and configured for displaying image(s)/video(s) transmitted from the memory unit;
    wherein when the sensed temperature of the application processor is higher than a predetermined temperature, the application processor directly sends a control command to the baseband processor via the universal asynchronous receiver/transmitter to direct the baseband processor to share workload of the application processor.

8. The electronic device as claimed in claim 7, wherein: the memory unit comprises a first memory unit connected to the application processor and a second memory unit connected to the baseband processor.

9. The electronic device as claimed in claim 8, wherein: each of the first memory unit and the second memory unit comprises a volatile memory and a non-volatile memory; the volatile memory is configured for temporarily storing runtime data and/or executed operation application(s); and the non-volatile memory is configured for storing data/information and other resident software.

10. The electronic device as claimed in claim 9, wherein: the first volatile memory is selected from the group consisting of static random-access memory (SRAM), pseudo-static random-access memory (pSRAM) and synchronous dynamic random-access memory (SDRAM) based memories and the first non-volatile memory is selected from the group consisting of not or flash (NOR Flash), not and flash (NAND Flash), mirror-bit Flash and read-only memory (ROM).

11. The electronic device as claimed in claim 8, wherein: the processing system comprises a first bus unit and a second bus unit correspondingly; the first bus unit connects the application processor and the first memory unit to each other; and the second bus unit connects the baseband processor and the second memory unit to each other.

12. The electronic device as claimed in claim 11, wherein: each of the first bus unit and the second bus unit comprises a data bus, a control bus and an address bus; the data bus is configured for transferring data between the memory unit and the display unit; the control bus is configured for transferring control commands to control and coordinate the processing system; and the address bus is configured for locating memory address of the data/information.

13. The electronic device as claimed in claim 7, wherein:
the display unit is a liquid crystal display.

* * * * *